(12) United States Patent
Hadl et al.

(10) Patent No.: US 11,585,259 B2
(45) Date of Patent: Feb. 21, 2023

(54) METHOD FOR ADJUSTING THE LOADING OF A PARTICULATE FILTER

(71) Applicant: AVL List GmbH, Graz (AT)

(72) Inventors: Klaus Hadl, Graz (AT); Hannes Noll, Styria (AT); Mario De Monte, Birkfeld (AT); Stefan Mannsberger, Graz (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 17/438,569

(22) PCT Filed: Mar. 12, 2020

(86) PCT No.: PCT/AT2020/060077
§ 371 (c)(1),
(2) Date: Sep. 13, 2021

(87) PCT Pub. No.: WO2020/181311
PCT Pub. Date: Sep. 17, 2020

(65) Prior Publication Data
US 2022/0162977 A1    May 26, 2022

(30) Foreign Application Priority Data
Mar. 14, 2019 (AT) .............................. A 50222/2019

(51) Int. Cl.
*F01N 13/00* (2010.01)
*F01N 3/023* (2006.01)
(Continued)

(52) U.S. Cl.
CPC ......... *F01N 13/009* (2014.06); *F01N 3/0231* (2013.01); *F01N 3/208* (2013.01);
(Continued)

(58) Field of Classification Search
CPC ...... F01N 13/009; F01N 3/0231; F01N 3/208; F01N 9/002; F01N 2250/02; F01N 2610/02
See application file for complete search history.

(56) References Cited

U.S. PATENT DOCUMENTS

2013/0125529 A1*  5/2013  Ardanese ................ F01N 9/002
                                                              60/274
2013/0305695 A1   11/2013  Henry et al.
(Continued)

FOREIGN PATENT DOCUMENTS

DE    102012221905    6/2014
DE    102015221982    5/2017
(Continued)

*Primary Examiner* — Brandon D Lee

(57) ABSTRACT

The invention relates in particular to a method for adjusting the loading (19) of a particulate filter (9) and to an assembly designed to carry out the method, wherein the exhaust gas aftertreatment unit (8) comprises at least two SCR systems (11, 12) and a particulate filter (9), a first operating material amount being introduced in a metered manner before the first SCR system (11), and a second operating material amount being introduced in a metered manner before the second SCR system (12), the operating material being convertible into a reducing agent. The state of loading of the particulate filter (9) is determined using a model, and, if the determined state of loading is below a previously defined loading range (16), the first operating material amount is adjusted in such a way that the amount of reducing agent is greater than or equal to the amount of reducing agent necessary for nitrogen oxide reduction in accordance with the reaction stoichiometry in the first SCR system (11), and/or, if the determined state of loading is above a previously defined loading range (16), the first operating material amount is adjusted in such a way that the amount of reducing agent is less than the amount of reducing agent necessary for (Continued)

nitrogen oxide reduction in accordance with the reaction stoichiometry in the first SCR system (11).

20 Claims, 3 Drawing Sheets

(51) Int. Cl.
     *F01N 3/20*          (2006.01)
     *F01N 9/00*          (2006.01)

(52) U.S. Cl.
     CPC .......... *F01N 9/002* (2013.01); *F01N 2250/02* (2013.01); *F01N 2610/02* (2013.01)

(56) References Cited

U.S. PATENT DOCUMENTS

| | | | |
|---|---|---|---|
| 2018/0087426 A1* | 3/2018 | Dou | F01N 9/002 |
| 2020/0224576 A1* | 7/2020 | Dou | F01N 3/0814 |

FOREIGN PATENT DOCUMENTS

| | | |
|---|---|---|
| DE | 102018101651 | 3/2018 |
| WO | WO 2009/017597 | 2/2009 |
| WO | WO 2015/130211 | 9/2015 |
| WO | WO 2017/034463 | 3/2017 |

\* cited by examiner

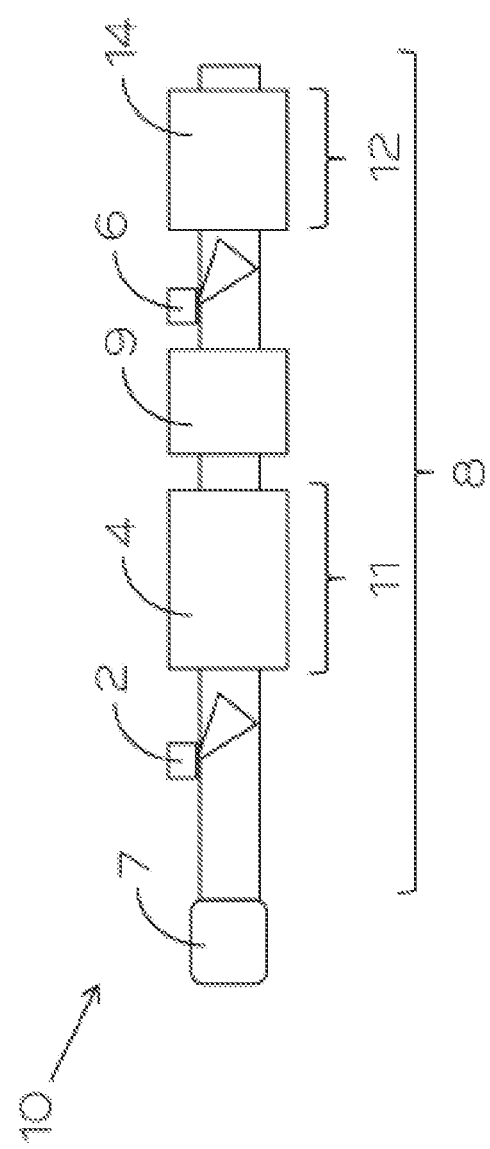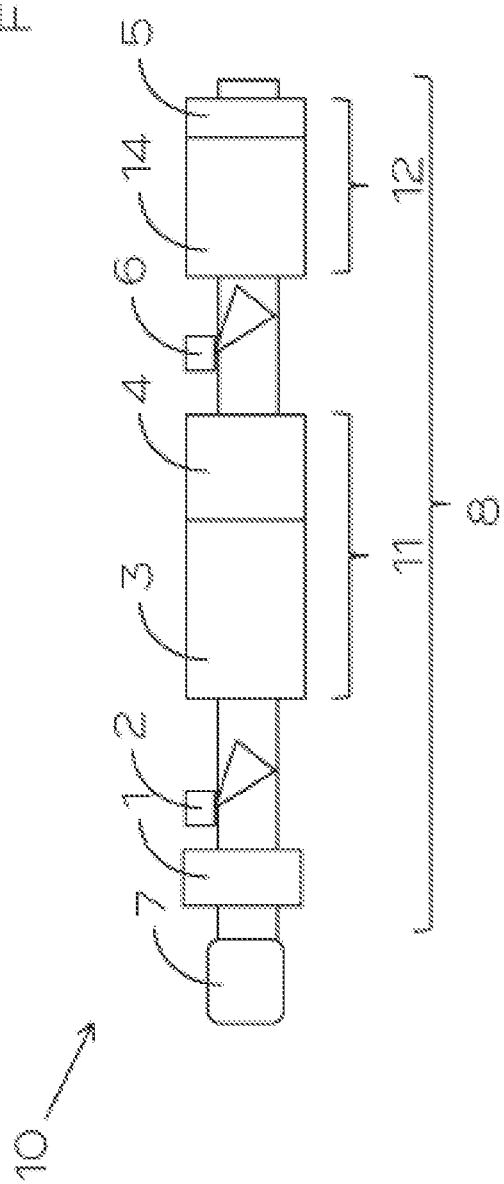

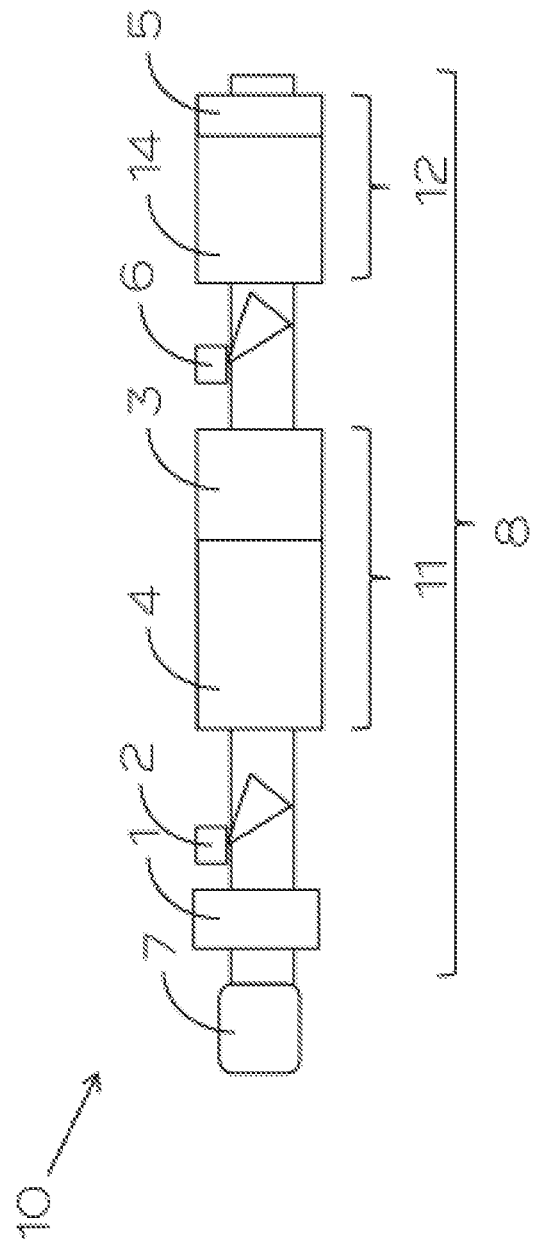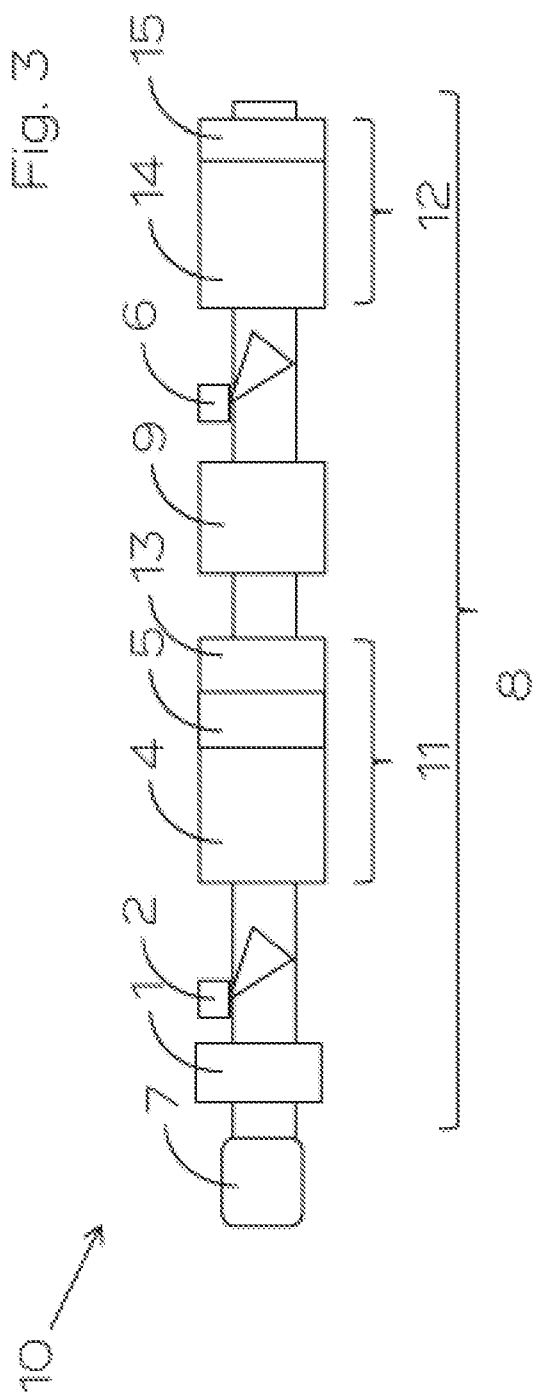

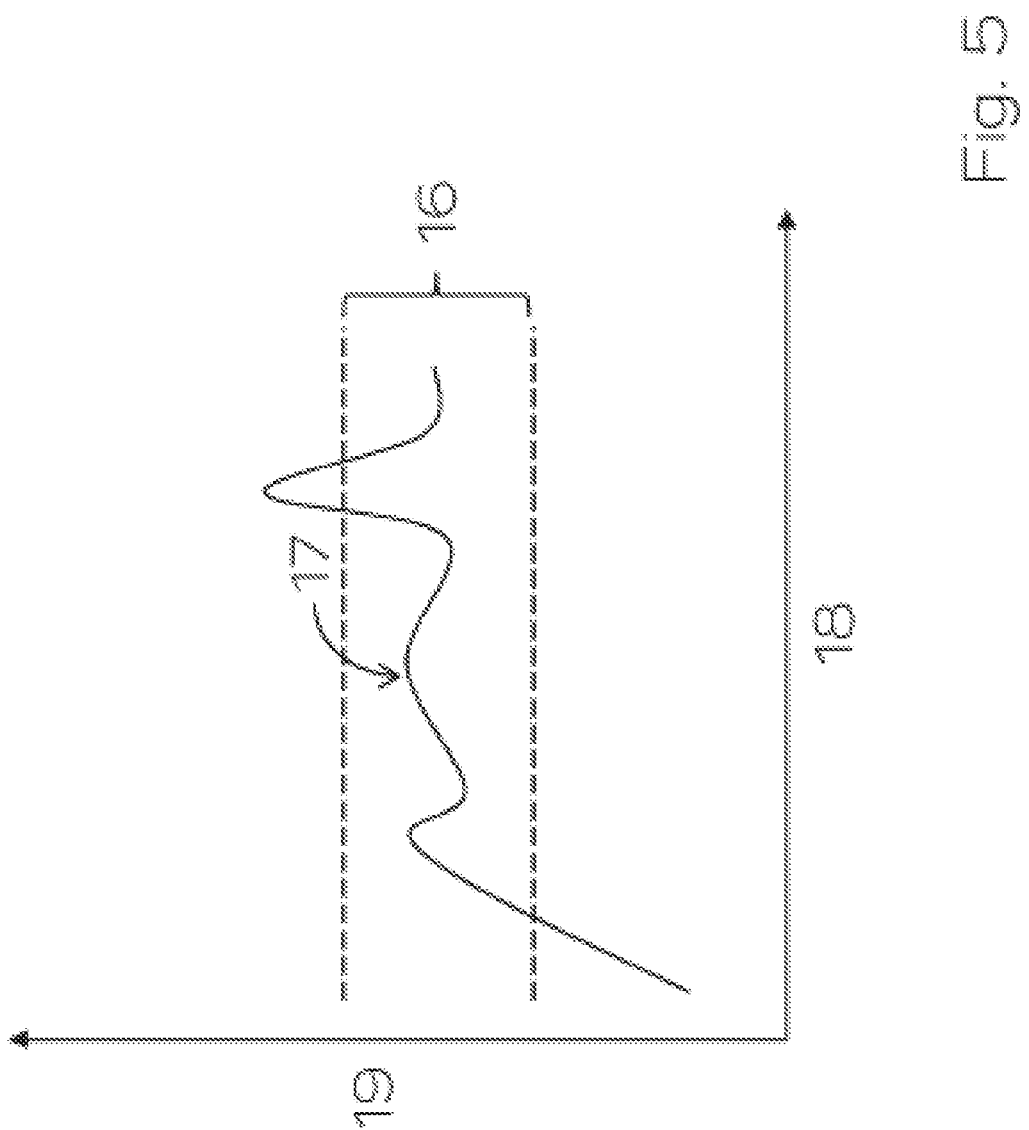

METHOD FOR ADJUSTING THE LOADING OF A PARTICULATE FILTER

RELATED APPLICATIONS

This application is a National Phase of PCT Patent Application No. PCT/AT2020/060077 having International filing date of Mar. 12, 2020, which claims the benefit of priority of Austria Patent Application No. A 50222/2019 filed on Mar. 14, 2019. The contents of the above applications are all incorporated by reference as if fully set forth herein in their entirety.

FIELD AND BACKGROUND OF THE INVENTION

The invention relates to a method according to the preambles of the independent claims. In particular, the invention relates to a method for adjusting and/or regulating the loading of a particulate filter and an arrangement designed for this purpose.

Different methods for regulating the loading of a particulate filter are known from the prior art. For example, methods are known in which the loading of the particulate filter is determined via the differential pressure. A disadvantage of such methods is, on the one hand, that in order to determine the loading a pressure sensor must be provided before the particulate filter and a pressure sensor after the particulate filter. Furthermore, in heavy vehicles, so-called heavy-duty vehicles, the state of loading of the particulate filter cannot be detected with sufficient accuracy via the differential pressure.

The object of the invention is to overcome the disadvantages of the prior art. In particular, it is the object of the invention to create a method for adjusting and/or regulating the loading of a particulate filter with which the loading of the particulate filter can be adjusted, easily, accurately and cost-effectively, in such a way that on the one hand the particulate filter exhibits a sufficiently high filtration efficiency and that on the other hand the flow resistance of the particulate filter is sufficiently low. The invention is thus based, inter alia, on the object of creating simple, accurate and cost-effective method for adjusting the loading of a particulate filter. In particular, a method is to be created which only uses the sensors of a conventional exhaust gas aftertreatment system.

SUMMARY OF THE INVENTION

The object according to the invention is in particular achieved through the features of the independent claim 1. The invention relates in particular to a method for adjusting and/or regulating the loading, in particular the soot loading, of a particulate filter of an exhaust gas aftertreatment system of an internal combustion engine, wherein the exhaust gas aftertreatment system comprises at least two SCR systems and a particulate filter, wherein the first SCR system is, in the direction of flow of the exhaust gas, arranged before or on the particulate filter, or the first SCR system includes the particulate filter, wherein the second SCR system is, in the direction of flow of the exhaust gas, arranged after the particulate filter, wherein, for nitrogen oxide reduction of the nitrogen oxides contained in the exhaust gas which is to be cleaned, a first operating material amount is or can be introduced in a metered manner before the SCR catalyst of the first SCR system, wherein, for nitrogen oxide reduction of the nitrogen oxides contained in the exhaust gas which is to be cleaned, a second operating material amount is or can be introduced in a metered manner before the SCR catalyst of the second SCR system, and wherein the operating material contains a reducing agent or can be converted into a reducing agent.

The particulate filter can be a diesel particulate filter or a petrol particulate filter.

Preferably, it is proposed that the state of loading, in particular the soot loading, of the particulate filter is determined using a model, in particular using a kinetic model, that, if the determined state of loading is below a previously defined loading range, the first operating material amount is adjusted in such a way that the amount of reducing agent is greater than or equal to the amount of reducing agent necessary for substantially complete nitrogen oxide reduction in accordance with the reaction stoichiometry in the first SCR system, and/or that, if the determined state of loading is above a previously defined loading range, the first operating material amount is adjusted in such a way that the amount of reducing agent is less than the amount of reducing agent necessary for substantially complete nitrogen oxide reduction in accordance with the reaction stoichiometry in the first SCR system.

Preferably, a suitable operating material for selective catalytic reduction such as, in particular, a urea-containing mixture, a urea solution or AdBlue®, is or can be introduced in a metered manner before the first and second SCR system. The operating material can contain a reducing agent such as, in particular, ammonia $NH_3$, or can be converted into a reducing agent such as, in particular, ammonia $NH_3$. Preferably, a urea-containing mixture, in particular a urea-water solution, for example AdBlue®, is used as operating material, whereby the operating material may, optionally, be converted into the reducing agent, in particular ammonia $NH_3$, through the following reactions:

Thermolysis: 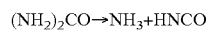

$(NH_2)_2CO \rightarrow NH_3 + HNCO$

Hydrolysis: 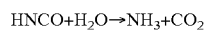

$HNCO + H_2O \rightarrow NH_3 + CO_2$

In a first step, in the thermolysis reaction the urea $(NH_2)_2CO$ can be converted into ammonia $NH_3$ and isocyanic acid HNCO. In a second step, in the hydrolysis reaction the isocyanic acid HNCO, with water $H_2O$, can be converted into ammonia $NH_3$ and carbon dioxide $CO_2$.

The reducing agent, in particular ammonia $NH_3$, can, optionally, be stored at least temporarily in the SCR catalyst of the respective SCR system. Optionally, the ammonia $NH_3$ accumulates on the active centres of the SCR catalyst. The at least temporarily stored reducing agent, in particular the ammonia $NH_3$, can then reduce nitrogen oxides NOx such as, in particular, nitric oxide NO and nitrogen dioxide $NO_2$.

The metering of the operating material can be effected by means of a metering device, in particular by means of an injector or by means of an injection nozzle. The metering device can be configured to introduce a pre-determined operating material amount before the respective SCR system, the respective SCR catalyst.

Within the context of the present disclosure, an SCR system can be understood to be, in particular, a system which includes an SCR-coated diesel particulate filter, a so-called SDPF, an SCR catalyst, a catalyst configured for selective catalytic reduction of nitrogen oxides and/or an ammonia slip catalyst, a so-called ASC, or which consists of an SCR-coated diesel particulate filter, a so-called SDPF, an SCR catalyst, a catalyst configured for selective catalytic reduction of nitrogen oxides and/or an ammonia slip catalyst, a so-called ASC.

However, within the context of the present disclosure, an SCR system can also be understood to be, in particular, a system which includes an SCR-coated petrol particulate filter (PPF). The method according to the invention is therefore suitable for both diesel engine arrangements and petrol engine arrangements.

In particular, the respective SCR system also includes one, two or three metering device(s) for the operating material, the operating material tank and/or, optionally, also the operating material as such. Preferably, the metering device(s) is/are arranged before the SCR system, in particular before the SCR catalyst.

When operating the internal combustion engine, an exhaust gas can be produced and/or generated which contains nitrogen oxides and flows through the exhaust gas aftertreatment system after exiting from the internal combustion engine.

Optionally, when flowing through the exhaust gas aftertreatment system the exhaust gas first passes through the first SCR system, then, or simultaneously, through the particulate filter and then through the second SCR system.

Optionally, the first SCR system comprises the particulate filter. In this case, an SCR coating can be provided on the particulate filter or the particulate filter can be designed in the form of an SDPF or PPF. Optionally, in this case the exhaust gas enters the first SCR system and the particulate filter, in particular in the SDPF or PPF, simultaneously, or first flows through the SCR catalyst of the first SCR system and then the particulate filter, in particular the SDPF or PPF.

Preferably, for nitrogen dioxide reduction, an operating material is or can be introduced in a metered manner before the first SCR system and the second SCR system. As a result, a reducing agent can be introduced into the exhaust gas aftertreatment system before the respective SCR system.

In contrast to conventional methods, the state of loading of the particulate filter, in particular the loading of the particulate filter, is calculated and/or determined using a model. This makes it possible to determine the loading of the particulate filter easily and cost-effectively, without needing to provide further sensors in the exhaust gas aftertreatment system.

Preferably, the operating material amounts are adjusted if the state of loading determined using the model is below or above a previously defined loading range.

In particular, the exhaust gas generated by the internal combustion engine flows through the exhaust gas aftertreatment system of the internal combustion engine, in particular through the SCR systems, preferably through the SCR catalysts of the SCR systems. In the SCR catalysts and/or the SDPF of the SCR systems, the nitrogen oxides emitted by the internal combustion engine can be converted into nitrogen and water.

The reduction of nitric oxide NO substantially proceeds, at a reduction temperature of over 250° C., according to the following specification:

$$4NO + 4NH_3 + O_2 \rightarrow 4N_2 + 6H_2O$$

Furthermore, it is possible that a so-called "fast SCR reaction" can takes place if both nitric oxide NO and nitrogen dioxide $NO_2$ is present in the exhaust gas and the reduction temperature lies within the range from 170° C. to 300° C. The fast SCR reaction substantially proceeds according to the following specification:

$$NO + 2NH_3 + NO_2 \rightarrow 2N_2 + 3H_2O$$

The reduction of nitrogen dioxide $NO_2$ substantially proceeds according to the following specification:

$$8NH_3 + 6NO_2 \rightarrow 7N_2 + 12H_2O$$

This means that the nitrogen oxide concentration or NOx concentration may be higher before the SCR systems, in particular before the SCR catalysts or the SDPF, than after the SCR systems.

It may be possible to oxidise the soot particles present in the particulate filter, in particular the carbon C, at least partially through nitrogen dioxide $NO_2$. This can make it possible to regenerate the particulate filter by reducing its soot loading quantity. The soot oxidation substantially takes place according to the following specification:

$$2NO_2 + C \rightarrow 2NO + CO_2$$

In particular, the regeneration temperature required for the soot oxidation processes when using nitrogen dioxide $NO_2$ is substantially lower than the regeneration temperature required for the soot oxidation processes when using oxygen $O_2$.

In a conventional diesel arrangement, the particulate filter can be passively regenerated within a temperature range which is achieved during the normal operation of the diesel arrangement, whereby the deposited carbon is oxidised by means of nitrogen dioxide. This so-called passive regeneration, the regeneration of the diesel engine particulate filter with $NO_2$, can be effective at particulate filter temperatures of less than 600° C., in particular of less than 500° C., preferably between 200° C. and 500° C.

The use of nitrogen dioxide-based regeneration and the lower temperatures occurring in the particulate filter makes it possible to increase the thermal and/or thermo-mechanical ageing resistance of the petrol engine particulate filter in the interests of sustainability.

In order to achieve an improved filtration efficiency, in particular a reduction of the particle count, a certain loading, a so-called soot cake, should be present in the particulate filter. However, the loading should also not be excessively high in order to avoid high flow resistances of the particulate filter and/or high backpressures.

The accumulation of a loading depends in particular on the passive regeneration. The method according to the invention allows the NOx concentration and thus also the $NO_2$ concentration to be regulated and/or adjusted before the particulate filter. In this way, the passive regeneration of the particulate filter can be influenced, as a result of which the loading of the particulate filter can also be regulated and adjusted. Moreover, the filtration efficiency of the particulate filter and the flow resistance caused by the particulate filter can also be influenced through the regulation and/or adjustment of the loading quantity.

In particular, if the determined state of loading is below the previously defined loading range, the first operating material amount is adjusted in such a way that a penetration of nitrogen oxides, in particular a penetration of nitrogen dioxide, through the first SCR system is prevented and/or reduced. That is to say, optionally, that as a result of the selected first operating material amount so much reducing agent, in particular $NH_3$, is introduced before the first SCR system that the NOx conversion efficiency of the first SCR system is maximised. In this case the amount of reducing agent, in particular $NH_3$, is greater than or equal to the amount necessary according to the corresponding reaction stoichiometry to convert the nitrogen oxides NOx contained in the exhaust gas substantially completely into nitrogen and water.

In this case, a regeneration of the particulate filter with nitrogen dioxide $NO_2$ can be minimised, in particular prevented and/or reduced. As a result, the loading or soot loading of the particulate filter can be increased, as a result of which, on the one hand, the filtration efficiency of the particulate filter can be increased. On the other hand, the flow resistance and/or the backpressure of the particulate filter can increase due to the increase in the loading of the particulate filter.

Preferably, if the determined state of loading is above the previously defined loading range, the first operating material amount is adjusted in such a way that the nitrogen oxides NOx contained in the exhaust gas, in particular the nitrogen dioxide $NO_2$ contained in the exhaust gas can, at least partially, pass through the first SCR system substantially unreduced and/or undiminished.

In this case, the particulate filter can be regenerated with nitrogen dioxide $NO_2$. This can reduce the loading in the particulate filter, as a result of which the flow resistance and/or the backpressure of the particulate filter, but also the filtration efficiency is reduced and/or can be reduced.

The internal combustion engine can be a combustion engine of a motor vehicle.

In all embodiments, the method according to the invention is preferably carried out in an automated manner, in particular controlled and/or regulated by a control device of the motor vehicle.

In particular, the method according to the invention is activated during normal operation of the internal combustion engine and/or during normal operation of the motor vehicle which includes the internal combustion engine. The means in particular that the method according to the invention can be carried out during the normal driving operation of the motor vehicle.

Optionally, the second operating material amount is reduced if the first operating material amount is increased, and/or the second operating material amount is adjusted in such a way that the amount of reducing agent is greater than or equal to the amount of reducing agent necessary for substantially complete nitrogen oxide reduction in accordance with the reaction stoichiometry in the second SCR system.

In this case, the nitrogen oxides produced by the internal combustion engine, in particular the generated $NO_2$, are converted into nitrogen and water, in particular substantially completely, in the first SCR system. Thus, it may only be necessary to introduce a relatively small second operating material amount in order to be able to comply with the regulations prescribed by law regarding nitrogen oxide emissions. In other words, in this case relatively little nitrogen oxide needs to be converted in the second SCR system.

That is to say, optionally, through the selected second operating material amount, so much reducing agent, in particular $NH_3$, is introduced before the second SCR system that the amount of reducing agent, in particular $NH_3$, is greater than or equal to the amount of reducing agent necessary according to the corresponding reaction stoichiometry in order to convert the nitrogen oxides NOx contained in the exhaust gas before the second SCR system, in particular after the particulate filter, in particular substantially completely, into nitrogen and water.

Optionally, the nitrogen oxides, in particular nitrogen dioxide, can be reduced through the passive regeneration of the particulate filter. As a result, the second operating material amount and in particular the amount of reducing agent introduced through the second operating material amount can be reduced by the nitrogen oxide amount consumed in the passive regeneration.

Optionally, the second operating material amount is increased if the first operating material amount is reduced, and/or the second operating material amount is adjusted accordingly, and/or the amount of reducing agent is greater than or equal to the amount of reducing agent necessary for substantially complete nitrogen oxide reduction in accordance with the reaction stoichiometry in the second SCR system.

In this case, a relatively small amount of nitrogen oxides is converted into nitrogen and water in the first SCR system. Thus, optionally, a relatively large second operating material amount must be introduced in order to comply with the regulations prescribed by law regarding nitrogen oxide emissions. In other words, in this case a relatively large amount of nitrogen oxides have to be converted in the second SCR system.

That is to say, optionally, through the selected second operating material amount, so much reducing agent, in particular $NH_3$, is introduced before the second SCR system that the NOx conversion efficiency of the second SCR system is maximised. In this case, the amount of reducing agent is greater than or equal to the amount of reducing agent necessary according to the corresponding reaction stoichiometry in order to convert the nitrogen oxides NOx contained in the exhaust gas before the second SCR system, in particular after the particulate filter, in particular substantially completely, into nitrogen and water.

Optionally, the nitrogen oxides, in particular the nitrogen dioxide, can be reduced through the passive regeneration of the particulate filter. As a result, the second operating material amount and in particular the amount of reducing agent introduced through the second operating material amount can be reduced by the nitrogen oxide amount consumed in the passive regeneration.

Optionally, the first and second operating material amount is maintained unchanged if the determined state of loading lies within the previously defined loading range.

In this case, the particulate filter has a state of loading which on the one hand allows sufficiently high filtration efficiency, and on the other hand the resulting flow resistance is sufficiently small.

In this case, the operating material amounts are controlled and regulated in the conventional manner known from the prior art.

Optionally, the particulate filter is a diesel particulate filter or an SCR-coated diesel particulate filter or the particulate filter comprises a diesel particulate filter or an SCR-coated diesel particulate filter, and/or the internal combustion engine is a diesel engine.

Optionally, the reactions of the particulate filter relevant to the method are, in addition to real operation, calculated in a model, in particular in a kinetic model, wherein the model corresponds in particular to a mathematical model of the physical model of the particulate filter used.

Optionally, the amount of nitrogen oxides in the exhaust gas which is to be cleaned is determined or calculated before the first SCR system, in particular before the SCR catalyst of the first SCR system, using a sensor and/or from an engine map, and/or the amount of nitrogen oxides in the exhaust gas which is to be cleaned is determined or calculated before the first SCR system, in particular before the SCR catalyst of the first SCR system, using a model, in particular a kinetic model, wherein the reactions and/or processes of the petrol engine relevant to the method are, in addition to real operation, calculated using the model, and wherein the model corresponds in particular to a mathematical model of the physical model of the internal combustion engine used.

Optionally, the amount of nitrogen oxides in the exhaust gas which is to be cleaned is determined or calculated before the second SCR system, in particular the SCR catalyst of the second SCR system, using a sensor, and/or the amount of nitrogen oxides in the exhaust gas which is to be cleaned is determined or calculated before the second SCR system, in particular before the SCR catalyst of the second SCR system, using models, in particular kinetic models, wherein the reactions relevant to the method of the first SCR system, in particular of the SCR catalyst, and of the particulate filter are, in addition to real operation, calculated using the models, wherein the kinetic model corresponds in particular to a mathematical model of the physical models.

The amount of nitrogen oxides in the exhaust gas which is to be cleaned can be determined and/or calculated in the region before the first SCR system, in particular between the internal combustion engine and the first SCR system, or between a diesel oxidation catalyst and the first SCR system.

The amount of nitrogen oxides in the exhaust gas to be cleaned may be determined and/or calculated in the region before the second SCR system, in particular after the SCR catalyst of the first SCR system and before the second SCR system, or between the SDPF and the second SCR system, or between the particulate filter and the second SCR system.

The reactions relevant to the method can be calculated in a mathematical, physical model. Optionally, the relevant reactions are modelled mathematically and physically by the kinetic model. The reactions can thus be based on physical conditions, as a result of which estimates and/or uncertainties can be reduced and as a result of which the accuracy of the modelled values can be increased. Optionally, it can be the case in all embodiments that real measured values are also included in the kinetic model as input variables.

For example, the kinetic model can also be used to model the oxidation of the reducing agent, in particular the oxidation of $NH_3$. In conventional methods and/or conventional models, the oxidation of reducing agents, if taken into account, can usually only be estimated, which is associated with considerable uncertainties or is very inaccurate. For example, such a kinetic model is disclosed in "Hollauf, Bernd: Model-Based Closed-Loop Control of SCR Based DeNOx Systems. Master's thesis, University of Applied Science Technikum Kärnten, 2009."

For example, a model can be used for the modelling of the particle filter which is based on the raw emissions of the internal combustion engine. Preferably, the model of the particle filter can determine the loading of the particle filter without pressure sensors.

Optionally, the exhaust aftertreatment components provided in the exhaust aftertreatment system can be modelled using a model, in particular a kinetic model. In particular, the reactions relevant for the method of the respective exhaust aftertreatment components may be calculated and/or determined in a mathematical, physical model.

Optionally, the amount of nitrogen oxides, in particular the amount of nitrogen dioxide, can be determined before the first SCR system and/or second SCR system using a sensor. In this case, the determination of the amount of nitrogen oxides can be carried out in a manner known from the prior art. Preferably, the determination of the amount of nitrogen oxides is carried out on the basis of the exhaust gas volume flow and the nitrogen oxide concentration determined by an NOx sensor. In particular, an NOx sensor is provided before the first SCR system and/or an NOx sensor is provided before the second SCR system.

Optionally, the amount of nitrogen oxides, in particular the amount of nitrogen dioxide, is determined and/or calculated from an engine map. The engine map can be determined during the course of conventional calibration.

Optionally, the first SCR system comprises an SCR catalyst, an SCR-coated diesel particulate filter and/or an ammonia slip catalyst, and the first SCR system comprises a first catalyst and, optionally, a second catalyst arranged after the first catalyst, wherein the first catalyst is the SDPF and, optionally, the second catalyst is the SCR catalyst, or wherein the first catalyst is the SCR catalyst and, optionally, the second catalyst is the SDPF, or wherein the first catalyst is the SCR catalyst and, optionally, the second catalyst is the ASC.

Optionally, the exhaust gas first flows through an SDPF of the first SCR system and then, optionally, through an SCR catalyst of the first SCR system, or the exhaust gas first flows through an SCR catalyst of the first SCR system and then, optionally, through an SDPF of the first SCR system, or the exhaust gas first flows through an SCR catalyst of the first SCR system and then, optionally, through an ASC of the first SCR system.

Optionally, the second SCR system comprises an SCR catalyst and, optionally, an ASC, and the SCR catalyst is arranged in front of the ASC.

Optionally, the exhaust gas first flows through an SCR catalyst of the second SCR system and then, optionally, through an ASC of the second SCR system.

Optionally, a diesel oxidation catalyst is provided before the first SCR system, and/or a diesel oxidation catalyst, or a further diesel oxidation catalyst, is provided between the first SCR system and the second SCR system and/or a diesel oxidation catalyst, or a further diesel oxidation catalyst, is provided between the first SCR system and the particulate filter.

Optionally, after exiting the internal combustion engine the exhaust gas first flows through a diesel oxidation catalyst, and/or, after exiting the first SCR system and before entering the second SCR system, the exhaust gas flows through a diesel oxidation catalyst, or a further diesel oxidation catalyst, and/or, after exiting the first SCR system and before entering the particulate filter, the exhaust gas flows through a diesel oxidation catalyst, or a further diesel oxidation catalyst.

Optionally, after exiting the internal combustion engine and before entering the first SCR system the exhaust gas first flows through the oxidation catalyst.

Optionally, after exiting the first SCR system and before entering the particulate filter and/or after exiting the first SCR system and before entering the second SCR system, the exhaust gas flows through the further oxidation catalyst.

Optionally, the exhaust gas first flows through the first SCR system which comprises the particulate filter, and then the second SCR system. In this case, the first SCR system can include an SDPF or can consist of an SDPF.

Optionally, the exhaust gas first flows through the first SCR system which comprises the particulate filter, and then through the second SCR system. In this case, the first SCR system can include an SDPF and an SCR catalyst arranged after the SDPF or can consist of an SDPF and an SCR catalyst arranged after the SDPF. In other words, the exhaust gas first flows through the SDPF, then through the SCR catalyst of the first SCR system, then through the SCR catalyst of the second SCR system and then, optionally, through the ASC of the second SCR system.

Optionally, the exhaust gas first flows through the first SCR system, then through the particulate filter and then through the second SCR system. In this case, the first SCR system can include an SCR catalyst and, optionally, an ASC arranged after the SCR catalyst or can consist of an SCR catalyst and, optionally, an ASC arranged after the SCR catalyst. In other words, the exhaust gas first flows through the SCR catalyst of the first SCR system, then, optionally, through the ASC, then through the particulate filter and then through the second SCR system.

Optionally, the second SCR system comprises an ASC which is provided after the SCR catalyst of the second SCR system. Optionally, the exhaust gas aftertreatment system includes a diesel oxidation catalyst, a so-called DOC, at least two SCR catalysts and/or an ASC, or the exhaust gas aftertreatment system consists of a diesel oxidation catalyst, a so-called DOC, at least two SCR catalysts and/or an ASC. Optionally, the exhaust gas aftertreatment system includes a DOC catalyst, a DPF catalyst, at least two SCR catalysts and/or an ASC catalyst, or the exhaust gas aftertreatment system consists of a DOC catalyst, a DPF catalyst, at least two SCR catalyst and/or an ASC catalyst. Optionally, the exhaust gas aftertreatment system includes a DOC catalyst, an SDPF catalyst, that is to say an SCR-coated DPF, an SCR catalyst and/or an ASC catalyst, or the exhaust gas aftertreatment system consists of a DOC catalyst, an SDPF catalyst, an SCR catalyst and/or an ASC catalyst.

Optionally, the exhaust gas aftertreatment system includes an SCR catalyst, a DOC catalyst, a DPF catalyst, a further SCR catalyst and/or an ASC catalyst, or the exhaust gas aftertreatment system consists of an SCR catalyst, a DOC catalyst, a DPF catalyst, a further SCR catalyst and/or an ASC catalyst.

Optionally, the exhaust gas aftertreatment system includes an SCR catalyst, a DOC catalyst, an SDPF catalyst, an SCR catalyst and/or an ASC catalyst, or the exhaust gas aftertreatment system consists of an SCR catalyst, a DOC catalyst, an SDPF catalyst, an SCR catalyst and/or an ASC catalyst.

Optionally, the exhaust gas aftertreatment system a DPF catalyst, at least two SCR catalysts and/or an ASC catalyst, or the exhaust gas aftertreatment system consists of a DPF catalyst, at least two SCR catalysts and/or an ASC catalyst.

Optionally, the exhaust gas aftertreatment system includes an LNT catalyst, an SDPF catalyst, an SCR catalyst and/or an ASC catalyst, or the exhaust gas aftertreatment system consists of an LNT catalyst, an SDPF catalyst, an SCR catalyst and/or an ASC catalyst.

Optionally, the exhaust gas aftertreatment system includes an LNT catalyst, a cDPF catalyst, that is to say a catalytic DPF, a ufSCR catalyst, that is to say an underfloor SCR, and/or an ASC catalyst, or the exhaust gas aftertreatment system consists of an LNT catalyst, a cDPF catalyst, a ufSCR catalyst and/or an ASC catalyst.

Optionally, the exhaust gas aftertreatment system includes an LNT catalyst, an SCR catalyst, an SDPF catalyst and/or an ASC catalyst, or the exhaust gas aftertreatment system consists of an LNT catalyst, an SCR catalyst, an SDPF catalyst and/or an ASC catalyst.

Optionally, the exhaust gas aftertreatment system includes an LNT catalyst, an SDPF catalyst, a ufSCR catalyst and/or an ASC catalyst, or the exhaust gas aftertreatment system consists of an LNT catalyst, an SDPF catalyst, a ufSCR catalyst and/or an ASC catalyst.

Optionally, the exhaust gas aftertreatment system includes an LNT catalyst, an SDPF catalyst, a ufSCR catalyst and/or an ASC catalyst, or the exhaust gas aftertreatment system consists of an LNT catalyst, an SDPF catalyst, a ufSCR catalyst and/or an ASC catalyst.

Optionally, one, two, three, four, five or all catalysts of the exhaust gas aftertreatment system are heatable or heated and are in particular designed as electrically heatable catalysts E-CAT.

Optionally, instead of the DOC catalyst and/or instead of the LNT catalyst the exhaust gas aftertreatment system includes a "passive NOx adsorber" PNA.

Optionally, in addition to the aforementioned catalysts the exhaust gas aftertreatment system includes a "passive NOx adsorber" PNA.

Optionally, in addition to the aforementioned catalysts the exhaust gas aftertreatment system includes a "pre-turbine catalyst" PTC.

Optionally, the exhaust gas aftertreatment system includes one or two metering devices and one, two or three NOx sensors and/or one, two or three $NH_3$ sensors, in particular an $NH_3$ sensor after the exhaust gas aftertreatment system.

Optionally, the first operating material amount is or can be introduced in a metered manner by means of a first metering device, wherein the first metering device is arranged before the first SCR system, in particular before the SCR catalyst of the first SCR system, and/or the second operating material amount is or can be introduced in a metered manner by means of a second metering device, wherein the second metering device is arranged before the second SCR system, in particular before the SCR catalyst of the second SCR system.

In particular, the invention relates to an arrangement, in particular a diesel engine arrangement, wherein the arrangement comprises an internal combustion engine and an exhaust gas aftertreatment system, wherein the exhaust gas aftertreatment system comprises at least two SCR systems and a particulate filter, characterised in that that the arrangement includes a control device to carry out the method according to the invention.

The arrangement, in particular the diesel engine arrangement, can be a part of a vehicle, in particular of a motor vehicle.

The arrangement, in particular the diesel engine arrangement, can be designed to carry out the method according to the invention.

BRIEF DESCRIPTION OF THE SEVERAL VIEWS OF THE DRAWINGS

Further features according to the invention are disclosed in the claims, the description, the exemplary embodiments and the figures.

The invention is now explained in more detail on the basis of exemplary, non-exclusive and/or non-limiting exemplary embodiments.

FIG. 1 shows a schematic graphical representation of a first embodiment of a diesel engine arrangement according to the invention, FIG. 2 shows a schematic graphical representation of a second embodiment of a diesel engine arrangement according to the invention, FIG. 3 shows a schematic graphical representation of a third embodiment of a diesel engine arrangement according to the invention, FIG. 4 shows a schematic graphical representation of a fourth embodiment of a diesel engine arrangement according to the invention, and FIG. 5 shows a schematic graphical representation of a diagram explaining the method according to the invention.

DESCRIPTION OF SPECIFIC EMBODIMENTS OF THE INVENTION

Unless otherwise specified, the reference signs correspond to the following components:

diesel oxidation catalyst 1, first metering device 2, SCR-coated diesel particulate filter 3, SCR catalyst 4, ammonia slip catalyst 5, second metering device 6, internal combustion engine 7, exhaust gas aftertreatment system 8, particulate filter 9, diesel engine arrangement 10, first SCR system 11, second SCR system 12, further diesel oxidation catalyst 13, further SCR catalyst 14, further ammonia slip catalyst 15, pre-defined loading range 16, progression over time of the state of loading 17, time 18 and loading 19.

Although all exemplary embodiments are directed at diesel engine arrangements, it should be noted that the invention is not limited to diesel engine arrangements, but also includes petrol engine arrangements.

FIG. 1 shows a schematic graphical representation of a first embodiment of the diesel engine arrangement 10 according to the invention which is designed to carry out the method according to the invention. In particular, the diesel engine arrangement 10 includes a control device (not shown) which is designed to carry out the method according to the invention.

According to this embodiment the diesel engine arrangement 10 comprises an internal combustion engine 7 designed in the form of a diesel engine and an exhaust gas aftertreatment system 8. The exhaust gas aftertreatment system 8 comprises a first SCR system 11, a particulate filter 9 and a second SCR system 12. The SCR systems 11, 12 each comprise an SCR catalyst 4, 14.

A first metering device 2 is provided before the first SCR system 11, in particular before the SCR catalyst 4 of the first SCR system 11. The first metering device 2 is designed to introduce a first operating material amount into the exhaust gas aftertreatment system 8 before the first SCR system 11.

A second metering device 6 is provided before the second SCR system 12, in particular before the SCR catalyst 14 of the second SCR system 12. The second metering device 6 is designed to introduce a second operating material amount into the exhaust gas aftertreatment system 8 before the second SCR system 12.

The exhaust gas is emitted from the diesel engine and then flows through the first SCR system 11, then through the particulate filter 9 and then through the second SCR system 12.

According to this embodiment, the state of loading of the particulate filter 9, the amounts of nitrogen oxides, in particular the amounts of nitrogen dioxide, before the first SCR system 11 and the second SCR system 12 are determined and/or calculated using models, in particular using kinetic models. If the determined state of loading of the particulate filter 9 is below or above a previously defined loading range 16, the operating material amounts are adjusted.

In a first case, the first operating material amount metered by means of the first metering device 2 is increased if the determined state of loading is below a previously defined loading range 16.

In particular, the first operating material amount is adjusted in such a way that the amount of reducing agent is greater than or equal to the amount of reducing agent necessary for substantially complete nitrogen oxide reduction in accordance with the reaction stoichiometry in the first SCR system. In this case it can be possible to reduce the nitrogen oxides emitted by the diesel engine, in particular the emitted nitrogen dioxides, as much as possible in the first SCR system 11. This can reduce and/or prevent the penetration of nitrogen oxides, in particular of nitrogen dioxide, through the first SCR system 11, as a result of which a passive regeneration of the particulate filter 9 is inhibited and/or can be reduced.

As a result of the inhibition and/or reduction of the passive regeneration of the particulate filter 9 a loading 19, in particular a soot cake, can be built up in the particulate filter 9. This can make it possible to increase the filtration efficiency of the particulate filter 9.

In a second case, the first operating material amount metered by means the first metering device 2 is reduced if the determined loading 19 is above a previously defined loading range 16.

In particular, the first operating material amount is adjusted in such a way that the amount of reducing agent is less than the amount of reducing agent necessary for substantially complete nitrogen oxide reduction in accordance with the reaction stoichiometry in the first SCR system 11. In this case it can be possible that the nitrogen oxides emitted by the diesel engine, in particular the emitted nitrogen dioxides, pass through the first SCR system 11 substantially unreduced and/or undiminished. As a result, a relatively high amount of nitrogen oxides, in particular a relatively high amount of nitrogen dioxide, can reach the particulate filter 9, as a result of which a passive regeneration of the particulate filter 9 can be made possible.

As a result of the passive regeneration of the particulate filter 9, the loading 19, in particular the soot cake, of the particulate filter 9 can be reduced and/or broken down. This can make it possible to reduce the flow resistance and/or the backpressure of the particulate filter 9.

According to this embodiment, the second operating material amount which is or can be introduced in a metered manner by means of the second metering device 6 is adjusted in such a way that the legal requirements are met and the environment protected as much as possible. That is to say that on the one hand the second operating material amount is reduced if the first operating material amount is increased, and on the other hand the second operating material amount is increased if the first operating material amount is reduced.

In other words, the second operating material amount is adjusted in such a way that the amount of reducing agent before the second SCR system 12 is greater than or equal to the amount of reducing agent necessary for substantially complete nitrogen oxide reduction in accordance with the reaction stoichiometry in the second SCR system 12.

FIG. 2 shows a schematic graphical representation of a second embodiment of the diesel engine arrangement 10 according to the invention which is designed to carry out the method according to the invention. The features of the embodiment according to FIG. 2 can preferably correspond to the features of the embodiment according to FIG. 1.

In contrast to the first embodiment of the diesel engine arrangement 10 according to the invention, the following exhaust gas aftertreatment components are provided along the exhaust gas aftertreatment system 8: a diesel oxidation catalyst 1, an SDPF 3, an SCR catalyst 4, a further SCR catalyst 14 and an ammonia slip catalyst 5.

According to this embodiment the first SCR system 11 comprises the SDPF 3 and the SCR catalyst 4 arranged after the SDPF 3. That is to say that according to this embodiment the first SCR system 11 includes the particulate filter 9.

According to this embodiment the second SCR system 12 comprises a further SCR catalyst 14 and the ammonia slip catalyst 5 arranged after the further SCR catalyst 14.

According to this embodiment the exhaust gas emitted by the diesel engine first flows through the diesel oxidation catalyst 1, then through the SDPF 3, then through the SCR catalyst 4, then through the further SCR catalyst 14 and then through the ammonia slip catalyst 5.

FIG. 3 shows a schematic graphical representation of a third embodiment of the diesel engine arrangement 10 according to the invention which is designed to carry out the method according to the invention. The features of the embodiment according to FIG. 3 can preferably correspond to the features of the embodiments according to FIGS. 1 and/or 2.

In contrast to the first and second embodiment of the diesel engine arrangement 10 according to the invention, the following exhaust gas aftertreatment components are provided along the exhaust gas aftertreatment system 8: a diesel oxidation catalyst 1, an SCR catalyst 4, an SDPF 3, a further SCR catalyst 14 and an ammonia slip catalyst 5.

According to this embodiment, the first SCR system 11 comprises the SCR catalyst 4 and the SDPF 3 arranged after the SCR catalyst 4. That is to say, according to this embodiment the first SCR system 11 includes the particulate filter 9.

According to this embodiment, the second SCR system 12 comprises a further SCR catalyst 14 and the ammonia slip catalyst 5 arranged after the further SCR catalyst 14.

According to this embodiment, the exhaust gas emitted by the diesel engine first flows through the diesel oxidation catalyst 1, then through the SCR catalyst 4, then through the SDPF 3, then through the further SCR catalyst 14 and then through the ammonia slip catalyst 5.

FIG. 4 shows a schematic graphical representation of a fourth embodiment of the diesel engine arrangement 10 according to the invention which is designed to carry out the method according to the invention. The features of the embodiment according to FIG. 4 can preferably correspond to the features of the embodiment according to FIGS. 1, 2 and/or 3.

In the contrast to the first, second and third embodiments of the diesel engine arrangement 10 according to the invention, the following exhaust gas aftertreatment components are provided along the exhaust gas aftertreatment system 8: a diesel oxidation catalyst 1, an SCR catalyst 4, an ammonia slip catalyst 5, a further diesel oxidation catalyst 13, a particulate filter 9, a further SCR catalyst 14 and a further ammonia slip catalyst 15.

According to this embodiment, the first SCR system 11 comprises the SCR catalyst 4 and the ammonia slip catalyst 5 arranged after the SCR catalyst 4.

According to this embodiment, the second SCR system 12 comprises a further SCR catalyst 14 and the further ammonia slip catalyst 15 arranged after the further SCR catalyst 14.

According to this embodiment, the exhaust gas first flows through the diesel oxidation catalyst 1, then through the SCR catalyst 4, then through the ammonia slip catalyst 5, then through the further diesel oxidation catalyst 13, then through the particulate filter 9, then through the further SCR catalyst 14 and then through the further ammonia slip catalyst 15.

FIG. 5 shows a schematic graphical representation of a diagram explaining the method according to the invention. In the diagram, the loading 19 of the particulate filter 9 is plotted over the time 18 in minutes. Further, this diagram also shows the pre-defined loading range 16 and the progression over time of the state of loading 17 of the particulate filter 9. According to this embodiment, the progression over time of the state of loading 17 is calculated and/or determined using a model, in particular a kinetic model.

The loading range 16 predefined in this diagram is the range in which the particulate filter 9 has a sufficiently high filtration efficiency and at the same time a sufficiently low flow resistance.

As soon as the loading 19 of the particulate filter 9 is above or below the previously defined loading range 16, the operating material amounts are adjusted according to the method according to the invention.

This configuration can be provided in all embodiments.

The effects according to the invention can be achieved by means of this exemplary configuration.

The invention is not limited to the embodiments described, but covers any method and arrangement, in particular any diesel engine arrangement 10 and petrol engine arrangements according to the following claims.

The invention claimed is:

1. A method for adjusting the loading (19) of a particulate filter (9) of an exhaust gas aftertreatment system (8) of an internal combustion engine (7),
   wherein the exhaust gas aftertreatment system (8) comprises at least two SCR systems (11, 12) and the particulate filter (9),
   wherein the first SCR system (11) is, in the direction of flow of the exhaust gas, arranged before or on the particulate filter (9), or the first SCR system (11) includes the particulate filter (9),
   wherein the second SCR system (12) is, in the direction of flow of the exhaust gas, arranged after the particulate filter (9),
   wherein, for nitrogen oxide reduction of the nitrogen oxides contained in the exhaust gas which is to be cleaned, a first operating material amount is introduced in a metered manner before the SCR catalyst (4) of the first SCR system (11),
   wherein, for nitrogen oxide reduction of the nitrogen oxides contained in the exhaust gas which is to be cleaned, a second operating material amount is introduced in a metered manner before the SCR catalyst (4) of the second SCR system (12),
   and wherein the first operating material or the second operating material contains a reducing agent,
   wherein the method comprises:
   determining the state of loading of the particulate filter (9) using a model,
   adjusting the first operating material amount in such a way that the amount of reducing agent is greater than or equal to the amount of reducing agent necessary for substantially complete nitrogen oxide reduction in accordance with the reaction stoichiometry in the first SCR system (11), if the determined state of loading is below a previously defined loading range (16),
   and/or adjusting the first operating material amount in such a way that the amount of reducing agent is less than the amount of reducing agent necessary for substantially complete nitrogen oxide reduction in accordance with the reaction stoichiometry in the first SCR system (11), when the determined state of loading is above the previously defined loading range (16),
   maintaining the first and second operating material amount unchanged when the determined state of loading is within the previously defined loading range (16).

2. The method according to claim 1, comprising
reducing the second operating material amount if the first operating material amount is increased,
and/or
adjusting the second operating material amount in such a way that the amount of reducing agent is greater than or equal to the amount of reducing agent necessary for substantially complete nitrogen oxide reduction in accordance with the reaction stoichiometry in the second SCR system (12).

3. The method according to claim 1, comprising
increasing the second operating material amount if the first operating material amount is reduced,
and/or adjusting the second operating material amount in such a way that the amount of reducing agent is greater than or equal to the amount of reducing agent necessary for substantially complete nitrogen oxide reduction in accordance with the reaction stoichiometry in the second SCR system (12).

4. The method according to claim 1, wherein
the particulate filter (9) is a diesel particulate filter or an SCR-coated diesel particulate filter (3) or the particulate filter (9) includes a diesel particulate filter or an SCR-coated diesel particulate filter (3),
and/or that the internal combustion engine (7) is a diesel engine.

5. The method according to claim 1, comprising calculating the reactions of the particulate filter (9) relevant to the method, in addition to real operation, in the model; wherein the model corresponds to a mathematical model of the physical model of the particulate filter (9) used.

6. The method according to claim 1, comprising
determining or calculating the amount of nitrogen oxides in the exhaust gas which is to be cleaned before the first SCR system (11) using a sensor and/or from an engine map,
and/or determining or calculating the amount of nitrogen oxides in the exhaust gas which is to be cleaned before the first SCR system (11) using a model,
wherein the reactions and/or processes of a petrol engine relevant to the method are, in addition to real operation, calculated using the model.

7. The method according to claim 1, comprising
determining or calculating the amount of nitrogen oxides in the exhaust gas which is to be cleaned before the second SCR system (12) using a sensor,
and/or determining or calculating the amount of nitrogen oxides in the exhaust gas which is to be cleaned before the second SCR system (12) using models,
wherein the reactions relevant to the method of the first SCR system (11) and of the particulate filter (9) are, in addition to real operation, calculated using the models.

8. The method according to claim 1, wherein
the first SCR system (11) comprises an SCR catalyst (4), an SCR-coated diesel particulate filter (3) and/or an ammonia slip catalyst (5),
and that the first SCR system (11) comprises a first catalyst and, a second catalyst arranged after the first catalyst,
wherein the first catalyst is the SDPF (3) and the second catalyst is the SCR catalyst (4),
or wherein the first catalyst is the SCR catalyst (4) and the second catalyst is the SDPF (3),
or wherein the first catalyst is the SCR catalyst (4) and the second catalyst is the ASC (5).

9. The method according to claim 1, wherein
the exhaust gas first flows through an SDPF (3) of the first SCR system (11) and then, flows through an SCR catalyst (4) of the first SCR system (11),
or that the exhaust gas first flows through an SCR catalyst (4) of the first SCR system (11) and then flows through an SDPF (3) of the first SCR system (11),
or that the exhaust gas first flows through an SCR catalyst (4) of the first SCR system (11) and then flows through an ASC (5) of the first SCR system (11).

10. The method according to claim 1, wherein
the second SCR system (12) comprises an SCR catalyst (4) and an ASC (5),
and that the SCR catalyst (4) is arranged before the ASC (5).

11. The method according to claim 1, wherein
the exhaust gas first flows through an SCR catalyst (4) of the second SCR system (12) and then flows through an ASC (5) of the second SCR system (12).

12. The method according to claim 1, wherein
a diesel oxidation catalyst (1) is provided before the first SCR system (11),
and/or that a (or a further) diesel oxidation catalyst (1, 13) is provided between the first SCR system (11) and the second SCR system (12),
and/or that a (or a further) diesel oxidation catalyst (1, 13) is provided between the first SCR system (11) and the particulate filter (9).

13. The method according to claim 1, wherein
after exiting the internal combustion engine (7) the exhaust gas first flows through a diesel oxidation catalyst (1),
and/or that after exiting the first SCR system (11) and before entering the second SCR system (12) the exhaust gas flows through a (or a further) diesel oxidation catalyst (1, 13),
and/or that after exiting the first SCR system (11) and before entering the particulate filter (9) the exhaust gas flows through a (or a further) diesel oxidation catalyst (1, 13).

14. The method according to claim 1, wherein
the first operating material amount introduced in a metered manner by means of a first metering device (2), wherein the first metering device is arranged before the first SCR system (11),
and/or that the second operating material amount introduced in a metered manner by means of a second metering device (6), wherein the second metering device (6) is arranged before the second SCR system (12).

15. The method according to claim 1, comprising
determining or calculating the amount of nitrogen oxides in the exhaust gas which is to be cleaned before the SCR catalyst (4) of the first SCR system (11) using a sensor and/or from an engine map,
and/or determining or calculating the amount of nitrogen oxides in the exhaust gas which is to be cleaned before the SCR catalyst (4) of the first SCR system (11) using a model,
wherein the reactions and/or processes of a petrol engine relevant to the method are, in addition to real operation, calculated using the model.

16. The method according to claim 1, comprising
determining or calculating the amount of nitrogen oxides in the exhaust gas which is to be cleaned before the SCR catalyst (4) of the second SCR system (12) using a sensor, and/or determining or calculating the amount of nitrogen oxides in the exhaust gas which is to be cleaned before the SCR catalyst (4) of the second SCR system (12) using models, wherein the reactions relevant to the method of the first SCR system (11) and of the particulate filter (9) are, in addition to real operation, calculated using the models.

17. The method according to claim 1, wherein the first operating material amount is introduced in a metered manner by means of a first metering device (2), wherein the first metering device is arranged before the SCR catalyst (4) of the first SCR system (11), and/or that the second operating material amount is introduced in a metered manner by means of a second metering device (6), wherein the second metering device (6) is arranged before the SCR catalyst (4) of the second SCR system (12).

18. The method according to claim 1, wherein the loading is a soot loading.

19. The method according to claim 1, wherein the model is a kinetic model.

20. An arrangement, comprising:

an internal combustion engine (7) and an exhaust gas aftertreatment system (8), wherein the exhaust gas aftertreatment system (8) comprises at least two SCR systems (11, 12) and a particulate filter (9), wherein the arrangement further includes a control device to carry out the method according to claim 1, wherein the model corresponds to a mathematical model of the physical model of the particulate filter (9) used.

* * * * *